US008738755B2

(12) United States Patent  
Bohm et al.

(10) Patent No.: US 8,738,755 B2
(45) Date of Patent: May 27, 2014

(54) PROVIDING EXTERNAL ACCESS TO SERVICE VERSIONS VIA A BUNDLE FRAMEWORK

(75) Inventors: Fraser P. Bohm, Salisbury (GB); Benjamin D. Cox, Winchester (GB); Ivan D. Hargreaves, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/229,295

(22) Filed: Sep. 9, 2011

(65) Prior Publication Data

US 2013/0067058 A1 Mar. 14, 2013

(51) Int. Cl.
*G06F 15/173* (2006.01)
(52) U.S. Cl.
USPC .......................................... 709/223
(58) Field of Classification Search
USPC ................... 709/224, 223, 217, 219, 220, 221
See application file for complete search history.

(56) References Cited

U.S. PATENT DOCUMENTS

| | | | |
|---|---|---|---|
| 6,272,521 B1 | 8/2001 | Jablonski et al. | |
| 7,886,286 B2 | 2/2011 | Rapicault et al. | |
| 7,890,945 B2 | 2/2011 | Jurkiewicz et al. | |
| 8,230,389 B2 * | 7/2012 | Beltowski et al. | 717/108 |
| 8,375,110 B2 * | 2/2013 | Jung et al. | 709/221 |
| 8,448,163 B2 * | 5/2013 | Backhouse | 717/174 |
| 2004/0194059 A1 | 9/2004 | Akella et al. | |
| 2005/0154785 A1 * | 7/2005 | Reed et al. | 709/217 |
| 2005/0210124 A1 | 9/2005 | Chua | |
| 2006/0242625 A1 | 10/2006 | Fey | |
| 2007/0260633 A1 | 11/2007 | Rapicault et al. | |
| 2008/0046882 A1 | 2/2008 | Blackhouse | |
| 2009/0070792 A1 | 3/2009 | Cable | |
| 2009/0144726 A1 | 6/2009 | Felts | |
| 2009/0276767 A1 | 11/2009 | Brannen, Jr. et al. | |
| 2009/0300093 A1 | 12/2009 | Griffiths et al. | |
| 2010/0017797 A1 * | 1/2010 | Hwang | 717/174 |
| 2010/0229165 A1 | 9/2010 | Normington et al. | |
| 2011/0010702 A1 * | 1/2011 | Vrushabendrappa et al. | 717/177 |
| 2011/0307877 A1 * | 12/2011 | Lambert et al. | 717/166 |
| 2012/0036252 A1 * | 2/2012 | Shi et al. | 709/224 |
| 2012/0204168 A1 * | 8/2012 | Charters et al. | 717/170 |
| 2012/0246316 A1 * | 9/2012 | Ramu et al. | 709/226 |

OTHER PUBLICATIONS

United States Patent and Trademark Office, Office Action for U.S. Appl. No. 13/229,205, Mar. 28, 2013, pp. 1-28, Alexandria, VA, USA.

(Continued)

*Primary Examiner* — Lashonda Jacobs
(74) *Attorney, Agent, or Firm* — Lee Law, PLLC; Christopher B. Lee

(57) ABSTRACT

A bundle entering a set of starting and active bundles within a bundle framework is detected by a controller bundle executed by a processor. It is determined whether a manifest of the bundle includes an extension header that identifies an application and an aliased additional version of the application. It is determined whether an active application proxy object that represents the application as an active service registered from a previously-started bundle already exists within a service registry. An inactive application proxy object that represents a defined entry point class of the application and an additional active application proxy object that represents a defined entry point class of the aliased additional version of the application are created. The created additional active application proxy object is registered as an additional service within the service registry of the bundle framework.

21 Claims, 6 Drawing Sheets

(56) References Cited

OTHER PUBLICATIONS

Erik Wistrand, et al., Everything can be a bundle—Making OSGi bundles of Java legacy code, Paper/presentation: OSGi Alliance Community Event, Jun. 10-11, 2008, pp. 1-29, OSGi Alliance, Berlin, Germany.

Author Unknown, Java applications that comply with OSGi, Online Information Center: CICS Transaction Server for z/OS, Version 4.2, Jun. 18, 2011, pp. 1-3, International Business Machines Corporation, Published on the World Wide Web at: https://publib.boulder.ibm.com/infocenter/cicsts/v4r2/index.jsp?topic=/com.ibm.cics.ts.java.doc/topics/planning_osgi.html.

Author Unknown, Updating OSGi bundles, Online Information Center: CICS Transaction Server for z/OS, Version 4.2, Jun. 18, 2011, pp. 1-2, International Business Machines Corporation, Published on the World Wide Web at: http://publib.boulder.ibm.com/infocenter/cicsts/v4r2/index.jsp?topic=/com.ibm.cics.ts.java.doc/JVMserver/updating_osgi.html.

Anne H. H. Ngu, et al., Semantic-Based Mashup of Composite Applications, IEEE Transactions on Services Computing, Feb. 23, 2010, pp. 2-15, vol. 3, No. 1, IEEE Computer Society, Published on the World Wide Web.

Author Unknown, OSGi Technology, Webpage/site: OSGi.org, 2011, pp. 1-5, OSGi Alliance, Published on the World Wide Web at: http://www.osgi.org/About/Technology.

Author Unknown, Writing Bundles, Framework Professional Edition Package, 2008, pp. 1-14 (plus 2 pages with table of contents/citation), ProSyst Software GmbH, Published on the World Wide Web at: http://dz.prosyst.com/pdoc/mBS_PE/um/framework/getting_started/writingBundles.html.

Authors Unknown, How to use OSGi from java application, Webpage/site: StackOverflow, May, 2010, pp. 1-2, Stack Exchange, Inc., Published on the World Wide Web at: http://stackoverflow.com/questions/2756784/how-to-use-osgi-from-java-application.

United States Patent and Trademark Office, Office Action for U.S. Appl. No. 13/229,205, Oct. 10, 2013, pp. 1-36, Alexandria, VA, USA.

United States Patent and Trademark Office, Notice of Allowance for U.S. Appl. No. 13/229,205, Jan. 9, 2014, pp. 1-12, Alexandria, VA, USA.

* cited by examiner

PROVIDING EXTERNAL ACCESS TO SERVICE VERSIONS VIA A BUNDLE FRAMEWORK

RELATED APPLICATIONS

This application is related to concurrently filed U.S. utility patent application Ser. No. 13/229,205, titled "LEGACY APPLICATION INTEGRATION WITHIN A BUNDLE FRAMEWORK," which is incorporated herein by reference in its entirety.

BACKGROUND

The present invention relates to bundle frameworks, such as Open Service Gateway Initiative (OSGI®) bundle frameworks. More particularly, the present invention relates to providing external access to service versions via a bundle framework.

Application servers and transaction processing servers provide capabilities for execution of applications or to process transactions, respectively, via a network, such as the Internet. Customer Information Control Systems (CICS®) represent one example of a transaction processing server environment. An Open Service Gateway Initiative (OSGI®) framework represents one example of a bundle execution environment or bundle framework. An OSGI® platform provides a mechanism to register services within an OSGI® framework executed by an application server or transaction processing server.

BRIEF SUMMARY

A method includes detecting, via a controller bundle executed by a processor, a bundle entering a set of starting and active bundles within a bundle framework; determining that a manifest of the bundle comprises an extension header that identifies an application and an aliased additional version of the application; determining that an active application proxy object that represents the application as an active service registered from a previously-started bundle already exists within a service registry; creating an inactive application proxy object that represents a defined entry point class of the application and an additional active application proxy object that represents a defined entry point class of the aliased additional version of the application; and registering the created additional active application proxy object as an additional active service within the service registry of the bundle framework.

A system includes a memory that stores a bundle framework and a processor programmed to detect, via a controller bundle executed by the processor, a bundle entering a set of starting and active bundles within a bundle framework; determine that a manifest of the bundle comprises an extension header that identifies an application and an aliased additional version of the application; determine that an active application proxy object that represents the application as an active service registered from a previously-started bundle already exists within a service registry; create an inactive application proxy object that represents a defined entry point class of the application and an additional active application proxy object that represents a defined entry point class of the aliased additional version of the application; and register the created additional active application proxy object as an additional active service within the service registry of the bundle framework.

A computer program product includes a computer readable storage medium including computer readable program code, where the computer readable program code when executed on a computer causes the computer to detect a bundle entering a set of starting and active bundles within a bundle framework; determine that a manifest of the bundle comprises an extension header that identifies an application and an aliased additional version of the application; determine that an active application proxy object that represents the application as an active service registered from a previously-started bundle already exists within a service registry; create an inactive application proxy object that represents a defined entry point class of the application and an additional active application proxy object that represents a defined entry point class of the aliased additional version of the application; and register the created additional active application proxy object as an additional active service within the service registry of the bundle framework.

DETAILED DESCRIPTION

Figure 1:
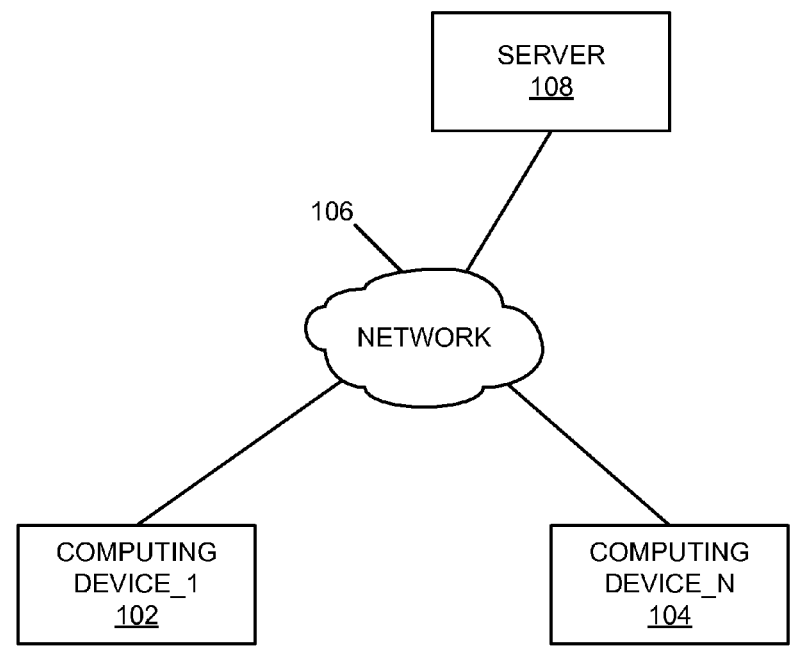
FIG. 1 is a block diagram of an example of an implementation of a system for providing automated external access to service versions via a bundle framework according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides external access to service versions via a bundle framework. The present subject matter allows services/applications defined within bundle execution environments/frameworks to be versioned, and for each version to be individually accessible via a public interface of the bundle framework. For purposes of the following description, the phrases "bundle framework" or "bundle platform" refer to any bundle execution environment, such as an Open Service Gateway Initiative (OSGI®) framework, that supports execution of bundles defined by the respective framework standards appropriate for the given execution environment. Certain of the examples below utilize OSGI® bundles and an OSGI® framework for ease of description purposes. However, this is not to be considered limiting as the present subject matter may be implemented within other bundle frameworks as appropriate for a given implementation.

Different versions of a service, such as an OSGI® service, may be targeted and executed concurrently from an environment external to a bundle framework, such as an OSGI® framework. The present subject matter operates by aliasing additional versions of an application. Both the entry-point(s) of the service(s) and the registered service(s) within the bundle framework become distinct, such that each version (alias) of the same bundle may be individually targeted from the outside of the bundle framework (e.g., via a transaction server that implements the bundle framework). Additionally, different versions may utilize the same entry point class name or a different name as appropriate for a given implementation.

The present subject matter extends the bundle manifest application, such as an OSGI® manifest application, with a new header that specifies one or more entry point classes into the application and one or more entry point classes into additional versions of the application. A new controller module is also installed into the bundle framework as a bundle. The new controller module operates as a listener mechanism and interfaces between the new bundle and a service registry, such as an OSGI® service registry. The new bundle includes one or more binaries that each encode a version of the same application. The new controller module registers a set of services that hold information about individual entry point classes for each version of the application in response to the bundle being started within the bundle framework. The new controller module loads an entry point class and calls its entry point method for a particular version of the application in response to an instruction to execute the particular version at the respective entry point.

It should be noted that conception of the present subject matter resulted from recognition of certain limitations associated with Open Service Gateway Initiative (OSGI®) bundle access from outside of an OSGI® framework. For example, it was recognized that for OSGI® the entry point that is published within an OSGI® framework (i.e., the service in the service registry) does not provide versioning. The result is that multiple services that are each provided by a different version of the same bundle are not distinct from outside of the OSGI® framework. As such, the different versions of a given bundle cannot be specifically targeted from an external environment. Additionally, in the case of a Customer Information Control System (CICS®), services implemented within the Java™ programming language are targeted by class name via a definition of a program resource. CICS® application calls target these abstract resource objects. The abstract resource objects are indirectly resolved to a specific Java™ language class to invoke. However, if multiple versions of a service (associated with one or more OSGI® bundles) are registered in CICS®, it is likely that they have the same class name for their key classes because they are different versions of the same bundle/code. As such, access to different versions of a bundle/code is not possible from outside of an OSGI® framework. The present subject matter improves access to different versions of code from outside of a bundle framework, such as an OSGI® framework, by providing for both version and entry point registration within the bundle framework, such as the OSGI® framework, as described above and in more detail below. As such, improved access to different versions of code may be obtained from outside of a bundle framework using the present subject matter.

The provided external access to service versions via a bundle framework described herein may be performed in real time to allow prompt versioning and registration of different versions of services within a bundle framework and access to those different registered versions from outside of the bundle framework. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for providing automated external access to service versions via a bundle framework. A computing device_1 102 through a computing device_N 104 communicate via a network 106 with a server 108. For purposes of the present examples, the computing device_1 102 through the computing device_N 104 may be considered client-type devices, while the server 108 may be considered either an application server or a transaction processing server. However, any other server appropriate for a given implementation may be used.

Any of the computing device_1 102 through the computing device_N 104 and/or the server 108 may provide automated external access to service versions via a bundle framework. As such and as will be described in more detail below in association with FIG. 2 through FIG. 6, for purposes of the present examples, the provided automated external access to service versions via a bundle framework is based upon registration of multiple versions of a service within a bundle framework at the server 108. Within the examples below, the automated external access to service versions via a bundle framework provides run-time access to multiple registered versions of a service within the bundle framework of the server 108.

It should be noted that the computing device_1 102 through the computing device_N 104 may be portable computing devices, either by a user's ability to move the respective computing device to different locations, or by the computing device's association with a portable platform, such as a plane, train, automobile, or other moving vehicle. For example, the computing device_1 102 through the computing device_N 104 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server 108 may include any device capable of providing data for consumption by a device, such as the computing device_1 102 through the computing device_N 104, via a network, such as the network 106. As such, the server 108 may include an application server, transaction processing server, or other server device.

Figure 2:
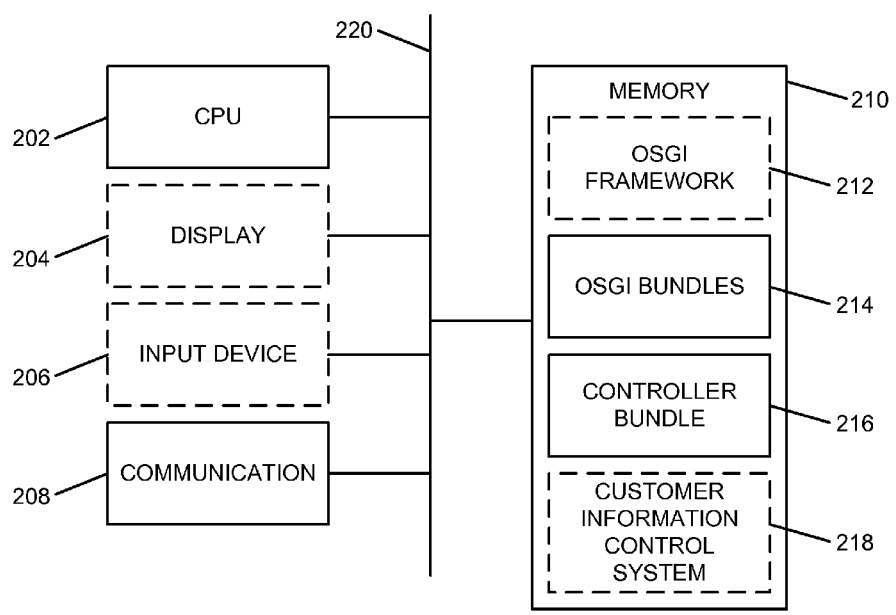
FIG. 2 is a block diagram of an example of an implementation of a core processing module capable of providing automated external access to service versions via a bundle framework according to an embodiment of the present subject matter.

FIG. 2 is a block diagram of an example of an implementation of a core processing module 200 capable of providing automated external access to service versions via a bundle framework. The core processing module 200 may be associated with either the computing device_1 102 through the computing device_N 104 or the server 108, as appropriate for a given implementation. Further, the core processing module 200 may provide different and complementary processing of multiple versions of services in association with each implementation, as described in more detail below.

For any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.). Further, differences between the implementation of the core processing module 200 for either the computing device_1 102 through the computing device_N 104 or the server 108 will be noted below.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, where the core processing module 200 is implemented in association with the server 108, the display 204 and the input device 206 may form a part of the server 108 or the server 108 may be remotely accessed for configuration and operation via the network 106. Similarly, where the core processing module 200 is implemented in association with the computing device_1 102 through the computing device_N 104, the display 204 and the input device 206 may form a part of the respective computing devices to allow localized user feedback and input, respectively. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 represents storage for application information, data, and other information for the core processing module 200. It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

The memory 210 includes an OSGI® framework 212. The OSGI® framework 212 includes proxy objects for the multiple versions of OSGI® services, as described in more detail below, that are registered within the OSGI® framework 212. The OSGI® framework 212 is shown with a dashed-line representation to show that this area may exist for those implementations that include an OSGI® framework.

Additionally, an OSGI® bundles storage area 214 stores OSGI® bundles, either as constructed at one of the computing device_1 102 through the computing device_N 104 for upload to the server 108, or at the server 108 for loading and execution within the OSGI® framework 212. It should be noted, as described above and in more detail below, that OSGI® bundles may be versioned and include an additional manifest header to the manifest file that specifies class entry points for the different versions of the OSGI® bundle that form a portion of the respective OSGI® bundle(s).

The memory 210 includes a controller bundle 216, either developed at one of the computing device_1 102 through the computing device_N 104 for upload to the server 108, or at the server 108 for loading and execution within the OSGI® framework 212. As described above and in more detail below, the controller bundle 216 is installed within the OSGI® framework 212 as an OSGI® bundle and provides interfaces for one or more OSGI® bundles that include multiple versions of OSGI® binaries for registration and execution within the OSGI® framework 212.

A customer information control system (CICS®) application area 218 stores and executes a CICS® application for implementations of the server 108 that include transaction processing capabilities. The CICS® application area 218 is shown in a dashed-line representation to show that this area may exist for those implementations that include transaction processing capabilities, such as at the server 108 when implemented as a transaction server.

It should be noted that the respective components illustrated and described within the memory 210 may alternatively be implemented as separate components that include any hardware, programmed processor(s), and memory used to carry out the functions of this component as described above and in more detail below. For example, these components may include additional controller circuitry in the form of application specific integrated circuits (ASICs), processors, and/or discrete integrated circuits and components for performing communication and electrical control activities associated with the respective devices. Additionally, the respective components may include interrupt-level, stack-level, and application-level modules as appropriate. Furthermore, the respective components may include any memory components used for storage, execution, and data processing for performing processing activities associated with the component.

Further, the CPU 202 may execute instructions associated with any of the components within the memory 210 to provide the processing capabilities described above and in more detail below for the core processing module 200. The respective components may form a portion of an interrupt service routine (ISR), a portion of an operating system, a portion of a browser application, or a portion of a separate application without departure from the scope of the present subject matter and as appropriate for the given implementation.

The CPU 202, the display 204, the input device 206, the communication module 208, and the memory 210 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

The following description provides additional detail and examples for providing automated external access to service versions via a bundle framework. The following examples utilize OSGI® bundles and an OSGI® framework for purposes of description. The following examples assume that an original base application (App_N) has been previously registered within the OSGI® framework 212 using a previously-installed bundle. The examples below begin with a second bundle that includes a second aliased version (VER_2) of the same application (App_N) entering a set of starting and active bundles within the OSGI framework 212. However, this arrangement may be swapped without departure from the scope of the present subject matter to allow subsequent versions of applications to be registered prior to base versions and base versions may then be processed as described in the examples below for the second aliased version.

To initiate the provisioning of multiple versions of a particular service, such as an OSGI® service, one additional header is added to the manifest file of the OSGI® bundle that includes the binary for the multiple versions of the OSGI® service. For purposes of the examples that follow, this additional header will be referred to as an "extension" header. Within the examples below, the extension header is termed "ExtensionMain-Class." However, it is understood that the name of the additional header may be considered implementation specific and may be changed as appropriate for a given implementation.

The following pseudo syntax provides one possible example of the use of this extension header in a bundle manifest.
Manifest-Version: 1.0
Bundle-ManifestVersion: 2
Bundle-Name: Bundle A
Bundle-SymbolicName: org.bundle.a
Bundle-Version: 1.0.0
Export-Package: org
ExtensionMain-Class: org.App_N; alias="VER_2"

It should be noted that this extension header "ExtensionMain-Class" operates to declare one or more entry points of the new OSGI® bundle. Within the present example, one entry point is declared for the second version of the same OSGI® service (App_N:VER_2). As such, this extension header provides a list of all available entry point classes and may include more than one entry point class. It should be noted that multiple entry point classes may have the same name in view of the aliasing of the OSGI® service. The aliasing of the OSGI® service provides service versioning. Using the aliasing described herein, both the entry point and the registered service within an OSGI® framework, such as the OSGI® framework 212, become distinct, such that each version (e.g., alias) of the same application may be individually targeted from the outside of the OSGI® framework. As such, multiple versions of an application/service may be targeted and executed concurrently from an external environment that utilizes the OSGI® framework. For example, a middle-ware or transaction server (e.g., a CICS® server) that includes an OSGI® framework as a sub-system may execute multiple versions of an OSGI® bundle concurrently.

In general, individual services are exposed that may be targeted from outside the OSGI®/Java™ server via external communications and each distinct version of the service creates its own distinct transport-level identity. Each distinct transport-level identity may, for example, represent a topic (e.g., host/port/URI/JMS topic) or other service identity as appropriate for a given implementation.

Additional details of the use of the entry points declared within this extension header of the example pseudo syntax above will be described beginning with FIG. 3 below. A preliminary description of processing for registration and invocation of multiple versions of an OSGI® service within an OSGI® framework, such as the OSGI® framework 212, is provided below prior to a specific example of each aspect beginning with FIG. 3.

To achieve versioning via aliasing as described herein, an abstraction is introduced where services are created for a use, such as via a transaction server (e.g., a CICS® server), to target via program object indirection. Each class that is to be exposed as a service is exposed with an alias identical to the class name of the service. To implement access to multiple versions of the same service, each service may be exposed with one or more additional symbolic names (aliases). The additional aliasing allows program objects to target either a specific version of a service by using a symbolic name or any available service by using the base class name.

Registration of multiple versions of a service by the controller module 216 involves an OSGI® bundle listener mechanism of the controller module 216. The listener mechanism may be implemented, for example, using the OSGI® BundleTracker class. When the listener mechanism is alerted to an OSGI® bundle entering the set of starting and active ("STARTING" and "ACTIVE") bundles, the listener mechanism checks the manifest for the OSGI® bundle and determines whether the manifest of OSGI® bundle includes an extension header, such as the "ExtensionMain-Class" header described within the example pseudo syntax above. If an extension header is found, the controller module 216 searches the service register within the OSGI® framework 212 for another registered service with the same base application name. If another registered service with the same base application name is found, then the controller module 216 creates a new application proxy object for the application (e.g., org.App_N) and registers (described in more detail below) that duplicated proxy object as an inactive proxy object within the service register. The controller module 216 also creates an additional active application proxy object for each of the defined entry point classes identified by the extension header as aliases for the application, and stores the entry point class name and a reference (e.g., pointer) to the bundle within that proxy object. For purposes of aliasing and accessing different versions of a particular service, the controller module 216 creates a new active proxy object for each version's entry point class(es).

As described above, the names of the entry point classes may be the same for the different versions of the service. Based upon the extension header within the example pseudo syntax above, two such proxy objects would be created by the processing of the extension header. The first proxy object would be an inactive proxy object representing the duplication of the base application within the new version of the bundle. The second proxy object would be an active proxy object that is registered to provide a service via the second version (VER_2). Each proxy object would identify an entry point as a class name (e.g., org.App_N and VER_2). It should be noted that, in order to ensure that lazy-activation bundles are not prematurely started by loading a class from the respective bundle, only the class name and not the class object is stored within the respective proxy objects. The created inactive proxy object for the redundant application registration is registered as an inactive service, while the created additional active application proxy object for each identified new/aliased version of the service within the bundle is registered as an OSGI® active service within an OSGI® service registry of the OSGI® framework 212 using the extension header as context for the respective OSGI® bundle, with an additional property that defines the entry point class name.

Starting a version of a service within an OSGI® framework involves an additional aspect of the controller module 216 that provides a mechanism for a server, such as the server 108 implemented for example as an application server or transaction processing server (e.g., as a CICS® server), to call a particular entry point class/version. The server 108 (e.g., the CPU 202) calls the controller module 216 and specifies the entry point class name of a version of the OSGI® service (e.g., org.App_N or VER_2). The controller module 216 searches for proxy objects registered as services within an OSGI® service registry that have an additional property, as described above, that matches the requested class name/version. For purposes of the present example, the controller module 216 would identify the original application (e.g., org.App_N) within the previously-registered active proxy object. The previously-registered active application proxy object would include a stored reference to the previously started bundle from which the original version of the application was registered. The controller module 216 would similarly identify the second version of the application (e.g., VER_2) within the additional active proxy object created and registered as a service for the second aliased version of the application. The additional active application proxy object would include a stored reference to the new version of the bundle from which the second aliased version of the application was registered. In response to identifying a registered service that matches the requested class name/version, the controller module 216 retrieves the requested matching service from the respective bundle (e.g., the previously-installed bundle for org.App_N or the incoming bundle for VER_2). The controller module 216 uses the bundle object reference stored within the proxy object and the class name stored within the proxy object to load the class from the respective bundle and call the specified entry method for the version of the OSGI® service.

Figure 3:
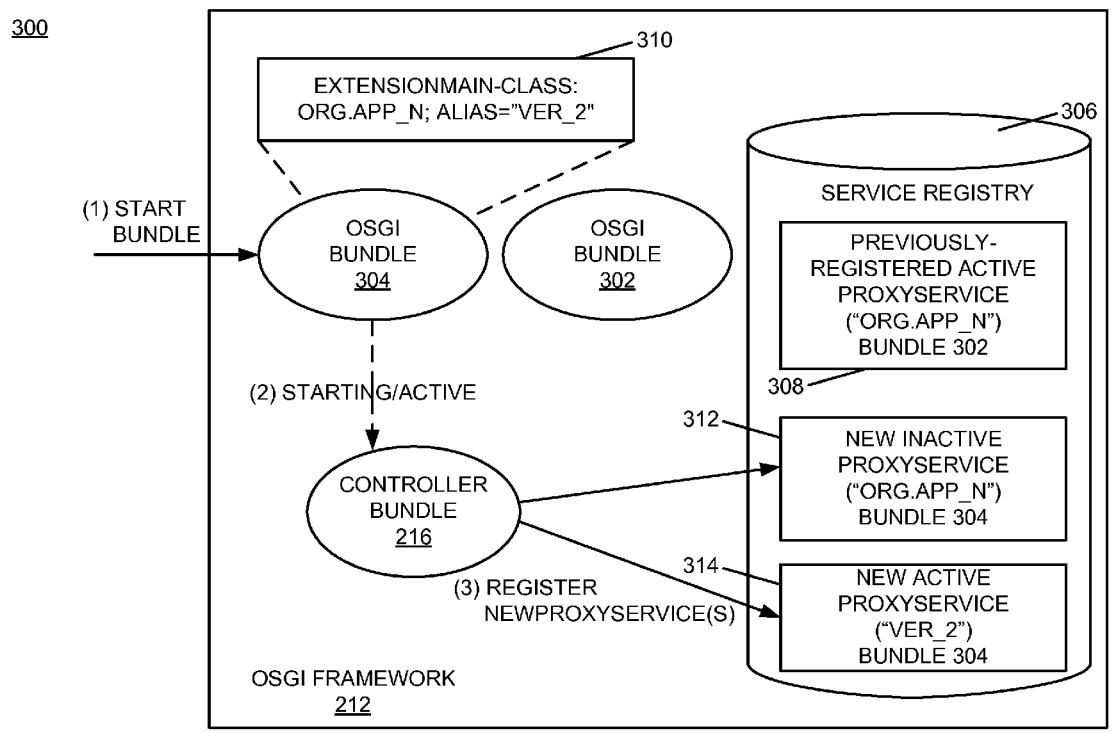
FIG. 3 is a flow diagram of an example of an implementation of a process for registering multiple versions of a service, such as multiple versions of an OSGI® service, within an OSGI® framework according to an embodiment of the present subject matter.
Figure 4:
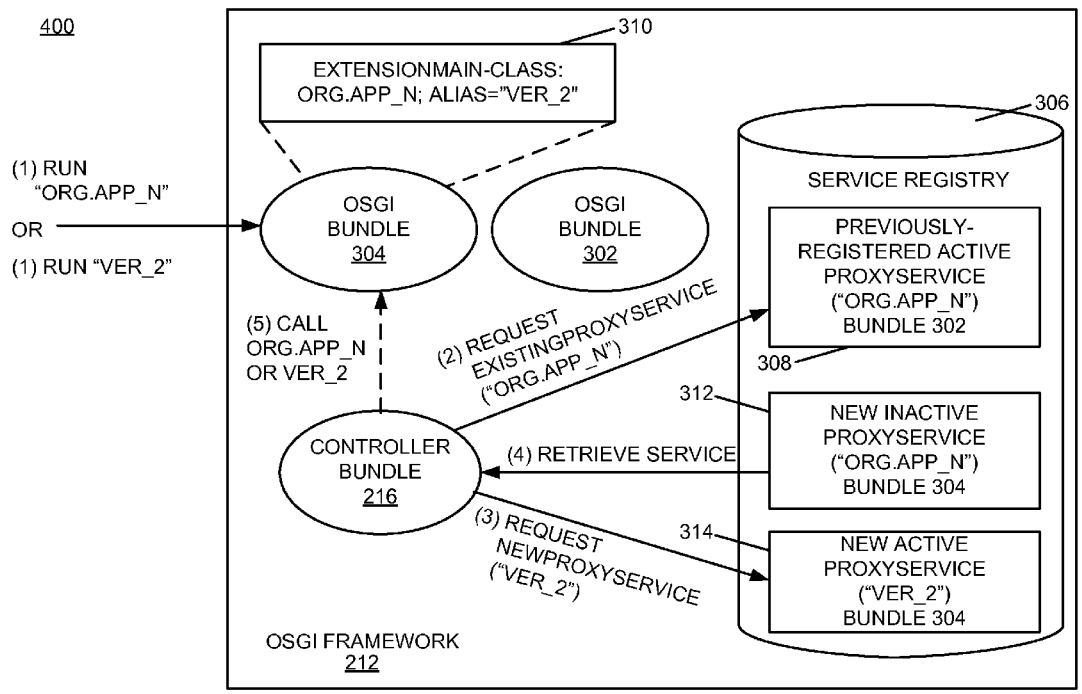
FIG. 4 is a flow diagram of an example of an implementation of a process for invoking multiple versions of a service, such as multiple versions of an OSGI® service, within an OSGI® framework according to an embodiment of the present subject matter.

FIGS. 3 and 4 provide examples of registration and invocation, respectively, of a second aliased version of an application by use of an OSGI® service with multiple versions for purposes of example. However, it is understood that the present subject matter may be applied to any form of service application that may be executed from within an OSGI® bundle. Capital letters are utilized within the drawing figures. However, it is understood that a mixture of upper and lower case may be utilized as appropriate for a given implementation (e.g., org.App_N is represented as ORG.APP_N within the drawing figures). It is understood that these different representations are equivalent for purposes of the present examples.

FIG. 3 is a flow diagram of an example of an implementation of a process 300 for registering multiple versions of a service, such as multiple versions of an OSGI® service, within the OSGI® framework 212. The example of FIG. 3 utilizes the example pseudo syntax shown and described above. As can be seen from FIG. 3, the controller bundle 216 has been installed within the OSGI® framework 212 (within the memory 210). As described above, regarding an initial state of the OSGI® framework 212 for purposes of the present example, it is assumed that an OSGI® bundle, bundle 302, is already installed and that another OSGI® bundle, bundle 304, is detected entering the set of starting and active bundles within the OSGI® framework 212.

As part of the initial state of the OSGI® framework 212 for purposes of the present example, a service registry 306 includes previously-registered active proxy object 308 that represents an initial version of the application (e.g., App_N) registered as a service within the OSGI® framework 212. The previously-registered active proxy object 308 includes a stored reference to the original bundle 302 and an entry point class name (e.g., org.App_N) for a defined entry point class for the original version of the service. The bundle 304 is shown to include an extension header 310 that includes an identification of a binary for one additional aliased version of the same service/application (e.g., VER_2, as described above).

In response to a "Start Bundle" instruction (Action 1) received by the bundle 304, for example from the CPU 202, the controller bundle 216 is alerted that the bundle 304 is entering the set of starting and active bundles (Action 2). The controller bundle 216 checks the manifest for the bundle 304 and determines whether the manifest of the bundle 304 includes the extension header 310, that the extension header 310 includes the alias identifier for the application (e.g., App_N; Alias="Ver_2"), and that the identifier of the aliased second version of the application is "Ver_2." In response to determining that the extension header 310 is present and that an alias is identified, the controller bundle 216 searches the service registry 306 for an existing previously-registered active proxy object that identifies the same application referenced within the extension header 310 (e.g., App_N). Within the present example, the controller bundle 216 identifies the previously-registered active proxy object 308 and determines that the service provided by the application is already registered.

In response to determining that the service provided by the application is already registered, the controller bundle 216 creates a new inactive proxy object 312 for the application (e.g., App_N) and creates a new additional active proxy object 314 for the defined entry point class (e.g., VER_2) identified by the extension header 310 and stores the entry point class name and a reference (e.g., a pointer) to the bundle 304 within the respective proxies. The controller bundle 216 registers the created inactive proxy object 312 and the created additional active proxy object 314 (Action 3).

It should be noted that the present description shows the inactive application proxy object 312 being registered for purposes of example. However, it should also be noted that it is not necessary to register an inactive service at the time of creation of an inactive application proxy object, such as the inactive application proxy object 312. For example, the active alias service provided by an additional active application proxy object, such as the additional active proxy object 314, may be initially registered to provide access to the additional version of the application (e.g., VER_2). The inactive application proxy object 312 may be registered at a later time if appropriate for a given implementation. Within the present example, the inactive application proxy object 312 is registered as an inactive service so that at some point later in time if the original application bundle, and as such the service provided by that bundle, is discarded, the inactive service may be converted to an active service and provide a seamless migration from one version of the application to the next.

The registered additional active proxy object 314 provides distinct external access for the new version of the OSGI® service (VER_2) as a distinct and separately-accessible OSGI® service within an OSGI® service registry 306 of the OSGI® framework 212 using the extension header 310 as context for the bundle 304, with an additional property that defines the entry point class name of the second version of the service (VER_2). As described above, the entry point class name may be the same for each version of the OSGI® service, or may be different as appropriate for a given implementation. Additionally, both versions, the bundle 302 and the bundle 304, may be targeted and run/executed simultaneously or concurrently.

FIG. 4 is a flow diagram of an example of an implementation of a process 400 for invoking multiple versions of a service, such as multiple versions of an OSGI® service, within the OSGI® framework 212. The example of FIG. 4 also utilizes the example pseudo syntax shown and described above. The controller bundle 216 receives/detects a call from the server 108 such as via the CPU 202 that specifies the entry point class name (e.g., org.App_N) or alias (e.g., VER_2) of a particular version of the OSGI® service to invoke (Action 1). In response to receiving/detecting the call to invoke the particular version of the OSGI® service, the controller bundle 216 determines whether the call references the original version of the application or the alias. In response to determining that the call references the original version of the application, the controller bundle 216 searches for proxy objects registered as services within the service registry 306 that have an additional property, as described above, that matches the requested class name of the application (Action 2). In response to determining that the call references the aliased version of the application, the controller bundle 216 searches for proxy objects registered as services within the service registry 306 that have an additional property, as described above, that matches the requested class name of the alias (Action 3).

As noted above, the requested class name may be the same for both versions and the versions may be searched for using either the class name or an alias. Further, multiple versions of a service may be executed concurrently without departure from the scope of the present subject matter. In response to identifying a registered service that matches the requested class name or alias, the controller module 216 retrieves the requested matching service (Action 4). The controller bundle 216 uses the bundle object reference stored within the respective proxy object (e.g., the bundle 302 for the original version and the bundle 304 for the aliased version) and the class name stored in the respective proxy object to load the class and call the specified entry method for the selected version of the OSGI® service (Action 5).

Removal of the proxy services of the bundle 302 or the bundle 304 from the service registry 306 may occur in response to the bundle 302 being stopped. This processing may be performed by the controller bundle 216. However, in view of the registration of the services using the bundle context of the bundle 302 and the bundle 304, the services may be effectively removed by the OSGI® framework 212 as the respective ones of the bundle 302 or the bundle 304 are stopped. Any other processing appropriate for a given implementation is considered within the scope of the present subject matter.

Figure 5:
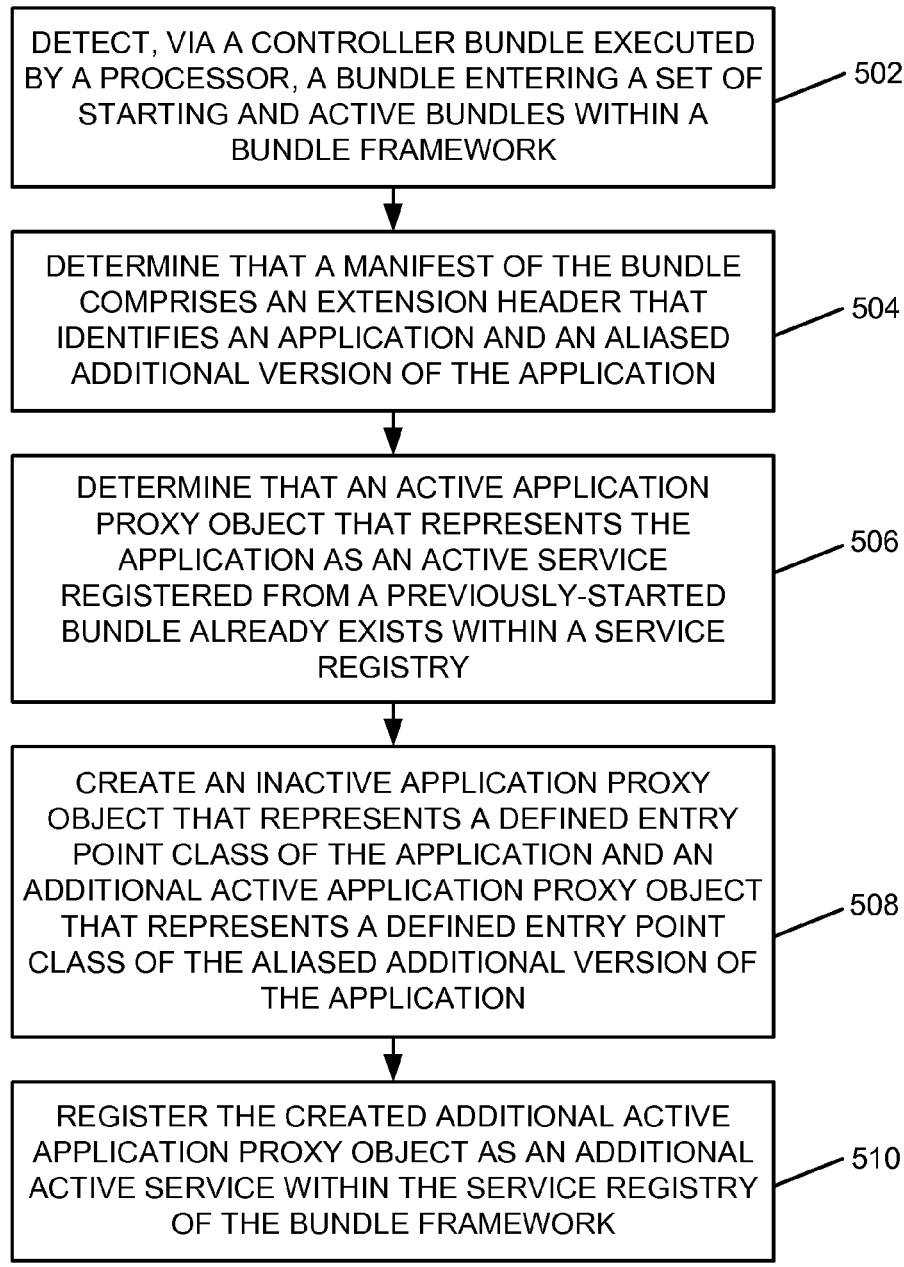
FIG. 5 is a flow chart of an example of an implementation of a process for automated external access to service versions via a bundle framework according to an embodiment of the present subject matter.
Figure 6:
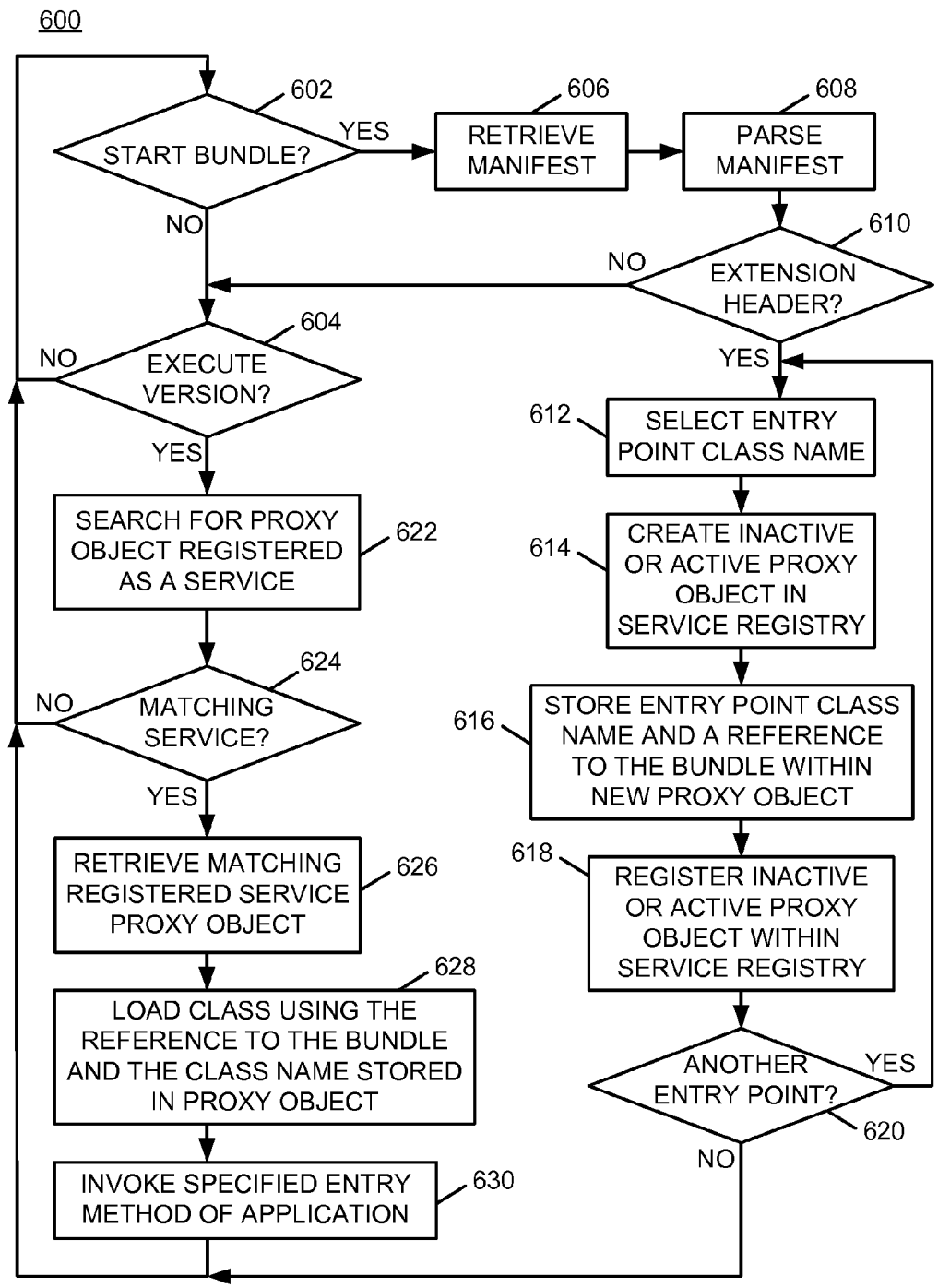
FIG. 6 is a flow chart of an example of an implementation of a process for automated external access to service versions, such as Open Service Gateway Initiative (OSGI®) service versions, via a bundle framework, such as an OSGI® framework according to an embodiment of the present subject matter.

FIG. 5 through FIG. 6 described below represent example processes that may be executed by devices, such as the core processing module 200, to perform the automated external access to service versions, such as Open Service Gateway Initiative (OSGI®) service versions, via a bundle framework, such as an OSGI® framework, associated with the present subject matter. Many other variations on the example processes are possible and all are considered within the scope of the present subject matter. The example processes may be performed by modules, such as the controller bundle 216 executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 5 is a flow chart of an example of an implementation of a process 500 for automated external access to service versions via a bundle framework. At block 502, the process 500 detects, via a controller bundle executed by a processor, a bundle entering a set of starting and active bundles within a bundle framework. At block 504, the process 500 determines that a manifest of the bundle comprises an extension header that identifies an application and an aliased additional version of the application. At block 506, the process 500 determines that an active application proxy object that represents the application as an active service registered from a previously-started bundle already exists within a service registry. At block 508, the process 500 creates an inactive application proxy object that represents a defined entry point class of the application and an additional active application proxy object that represents a defined entry point class of the aliased additional version of the application. At block 510, the process 500 registers the created additional active application proxy object as an additional active service within the service registry of the bundle framework.

FIG. 6 is a flow chart of an example of an implementation of a process 600 for automated external access to service versions, such as Open Service Gateway Initiative (OSGI®) service versions, via a bundle framework, such as an OSGI® framework. The process 600 may be executed by a controller bundle, such as the controller bundle 216 executed by a processor such as the CPU 202. It should be noted that the present description is directed to processing to provide external access to OSGI® service versions from within an OSGI® framework, and that processing for loading other applications that are not versioned has been omitted for brevity. However, it is understood that the process 600 may be modified to process other applications that are not versioned without departure from the scope of the present subject matter. It is further assumed that a previously-installed bundle, such as the bundle 302, has already had a service registered within a bundle framework, such as via the previously-registered active proxy object 308 within the service registry 306.

At decision point 602, the process 600 makes a determination as to whether an OSGI® bundle entering a set of starting and active bundles within a bundle framework such as the OSGI® framework 212 has been detected, such as via a controller bundle such as the controller bundle 216 executed by a processor such as the CPU 202. The OSGI® bundle entering a set of starting and active bundles within the OSGI® framework 212 may be detected, for example, in response to receipt of a "Start Bundle" instruction or alert, such as that described in association with FIG. 3 above.

In response to determining that an OSGI® bundle entering the set of starting and active bundles within the OSGI® framework 212 has not been detected, the process 600 begins higher level processing iteration and determines at decision point 604 as to whether a request to execute a specified version of an application has been detected. A request to execute a specified version of an application may include, for example, a call to an entry point class that specifies an entry point class name of a specific version of an application that has been detected via the controller bundle 216 executed by the CPU 202. The call to the entry point class that specifies the entry point class name of the specified version of the application may be detected, for example, in response to receipt of a "Run" instruction or alert as described in association with FIG. 4 above.

In response to determining that a call to the entry point class that specifies the entry point class name of the specific version of an application has not been detected, the process 600 returns to decision point 602 and iterates as described above. In response to determining at decision point 602 that an OSGI® bundle entering the set of starting and active bundles within the OSGI® framework 212 has been detected, the process 600 retrieves the manifest of the bundle at block 606. At block 608, the process 600 parses the manifest of the bundle.

At decision point 610, the process 600 makes a determination as to whether an extension header, as described in detail above, has been added to the manifest that includes an executable binary of an application and at least one aliased additional version of the application. As described above, the extension header may define one or more entry point classes of one or more versions of one or more applications. As such, multiple applications each with one or more aliased additional versions may be referenced within the same extension header without departure from the scope of the present subject matter.

In response to determining that an extension header has not been added to the manifest that includes an executable binary of the application and at least one aliased additional version of the application, the process 600 returns to decision point 604 and iterates as described above. Additionally, as noted above, the present description is directed to processing to expose multiple versions of applications via a public interface of an OSGI® framework so that the respective versions may be individually targeted for execution, and processing for loading other applications has been omitted for brevity. However, it is understood that the process 600 may be modified to process other applications without departure from the scope of the present subject matter.

In response to determining at decision point 610 that an extension header has been added to the manifest that includes an executable binary of the application and at least one aliased additional version of the application, the process 600 selects a defined entry point class name from the extension header at block 612. For purposes of the present description, it is assumed that the first selection of a defined entry point class represents a base entry point class of a base version (relative to one or more aliased versions) and that subsequent iterations may select aliased versions of the application via the an entry point class of the same or a different name. However, aliased versions may be selected for registration prior to base versions as appropriate for a given implementation. At block 614, the process 600 creates a new inactive proxy object within a service registry for the defined entry point class of the application identified by the extension header. As described above, further iterations of the processing that begins at block 614 may create additional active proxy objects for aliased versions of an application, as described above and in more detail below. At block 616, the process 600 stores an entry point class name of the defined entry point class and a reference to the bundle within the respective (inactive or additional active) proxy object created for that defined entry point class. It should be noted that the process 600 stores the class name and does not store a class object within the respective proxy object. Storage of the class name is sufficient for purposes of the present subject matter. At block 618, the process 600 registers either the created inactive application proxy object for the application as an inactive service within the service registry of the bundle framework, such as the service registry 306 of the OSGI® framework 212, or registers the created additional active application proxy object within the service registry of the bundle framework.

As described above, it should be noted that the inactive application proxy object may be initially registered as an inactive service or may be registered either as an inactive service or an active service at a later point in time. Registration of the inactive application proxy object as an inactive service may provide seamless migration from one version of the application to the next at some point later in time if the original application bundle, and as such the service provided by that bundle, is discarded. In such a situation, if registered as an inactive service, the inactive service may be converted to an active service. Alternatively, the inactive application proxy object may be registered directly as an active service as appropriate for a given implementation.

At decision point 620, the process 600 makes a determination as to whether another application or another aliased version of an application is identified within the extension header for the bundle. In response to determining that another application or another aliased version of an application is identified within the extension header for the bundle, the process 600 returns to block 612 to select another defined entry point class name from the extension header and iterates as described above to create inactive or active proxy objects (based upon whether the application is a duplicate of the base application or is an aliased application, respectively), store entry point classes and a reference (e.g., pointer) to the bundle within the created proxy objects, and register the inactive proxy objects or additional active proxy objects within the service registry for each additional application or aliased version of an application, respectively, identified within the extension header. In response to determining that all applications and aliased additional versions of applications identified within the extension header for the bundle have been processed at decision point 620, the process 600 returns to decision point 602 and iterates as described above. As such, the process 600 may iteratively create inactive and active proxy objects for base versions and aliased versions of applications, respectively, and register those proxy objects with an OSGI® framework so that each version of each application is independently targetable from outside of the OSGI® framework 212. Further, each such version may be concurrently executed from the OSGI® framework 212 in response to external calls to the respective versions.

Returning to the description of decision point 604, in response to determining that a call to an entry point class that specifies a version of an application has been detected via the controller bundle 216 executed by the CPU 202, the process 600 searches for a proxy object registered as a service within the service registry that includes an additional property that matches the requested class name of one of the application or an aliased additional version of the application at block 622. At decision point 624, the process 600 makes a determination as to whether an active application proxy object is identified as a registered service that represents either the base application or an aliased additional version of an application within the service registry that includes an entry point class name of one of the application or an aliased additional version of the application that matches the requested class name.

In response to determining that an active application proxy object is not identified as a registered service that represents either the base application or an aliased additional version of an application within the service registry that includes an entry point class name of the application or an aliased additional version of the application that matches the requested class name, the process 600 returns to decision point 602 and iterates as described above. It should be noted that processing such as generation of a response message indicating that a matching registered service has not been identified may be completed, as appropriate for a given implementation.

In response to determining at decision point 624 that an active application proxy object is registered as a service within the service registry that includes an entry point class name of the application or an aliased additional version of the application that matches the requested class name, the process 600 retrieves the respective matching registered service proxy object, such as the previously-registered active proxy object 308 or the new active proxy object 314, at block 626. At block 628, the process 600 loads the class using the reference to the respective bundle (e.g., the previously-started bundle 302 or the newly-started bundle 304, respectively) stored within the respective active proxy object (e.g., the previously-registered active proxy object 308 or the new active proxy object 314) and the class name stored within the respective application proxy object. As such, the process 600 may load either a base version of an application from a previously installed bundle or an aliased version of an application from a newly-installed bundle, as specified within the request. At block 630, the process 600 issues a call to the loaded class and invokes the specified entry method for the application or an aliased additional version of the application. The process 600 returns to decision point 602 and iterates as described above.

As such, the process 600 processes started bundles and determines whether an extension header that defines one or more applications and one or more aliased versions of any of the applications is present within a manifest for the respective bundles. The process 600 creates inactive application proxy objects for each entry point class name defined within an extension header of the bundle for base versions and creates active application proxy objects for aliased versions of applications, and registers the respective proxy objects as either inactive or active services, respectively, within a service registry of an OSGI® framework. The process 600 also processes requests to execute either applications or aliased versions of applications, and searches the service registry for active proxy objects with entry point class names that match the requested versions of applications to be executed. The process 600 retrieves, loads, and invokes the requested versions of applications in response to identifying a matching proxy object.

As described above in association with FIG. 1 through FIG. 6, the example systems and processes provide automated external access to service versions via a bundle framework. Many other variations and additional activities associated with automated external access to service versions via a bundle framework are possible and all are considered within the scope of the present subject matter.

Those skilled in the art will recognize, upon consideration of the above teachings, that certain of the above examples are based upon use of a programmed processor, such as CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   detecting, via a controller bundle executed by a processor, a bundle entering a set of starting and active bundles within a bundle framework;
   determining that a manifest of the bundle comprises an extension header that identifies an application and an aliased additional version of the application;
   determining that an active application proxy object that represents the application as an active service registered from a previously-started bundle already exists within a service registry;
   creating an inactive application proxy object that represents a defined entry point class of the application and an additional active application proxy object that represents a defined entry point class of the aliased additional version of the application; and
   registering the created additional active application proxy object as an additional active service within the service registry of the bundle framework.

2. The method of claim 1, further comprising registering the created inactive application proxy object as an inactive service within the service registry of the bundle framework.

3. The method of claim 1, where determining that the manifest of the bundle comprises the extension header that identifies the application and the aliased additional version of the application comprises:
   retrieving the manifest of the bundle;
   parsing the manifest of the bundle; and
   determining that the extension header comprises an executable binary of the application and the aliased additional version of the application.

4. The method of claim 1, where determining that the active application proxy object that represents the application as the active service registered from the previously-started bundle already exists within the service registry comprises:
   searching the service registry of registered application proxy objects; and
   identifying the active application proxy object that represents the application as an active service registered from the previously-started bundle as one of the registered application proxy objects.

5. The method of claim 1, where creating the inactive application proxy object that represents the defined entry point class of the application and the additional active application proxy object that represents the defined entry point class of the aliased additional version of the application comprises:
   storing an entry point class name of the defined entry point class within the additional active application proxy object;
   storing a reference to the bundle within the additional active application proxy object;
   storing an entry point class name of the defined entry point class within the inactive application proxy object; and
   storing the reference to the bundle within the inactive application proxy object.

6. The method of claim 5, where the active application proxy object that represents the application as the active service registered from the previously-started bundle comprises a stored reference to the previously-started bundle and a stored entry point class name of the application within the previously-started bundle and further comprising:
   detecting, via the controller bundle executed by the processor, a request to execute the application;
   identifying the active application proxy object that represents the application within the service registry;
   retrieving, from the service registry, the reference to the previously-started bundle and the entry point class name stored within the active application proxy object that represents the application as the active registered service;
   loading the defined entry point class of the application from the previously-started bundle using the retrieved reference to the previously-started bundle and the retrieved entry point class name; and
   calling an entry method of the defined entry point class of the application within the previously-started bundle.

7. The method of claim 5, further comprising:
   detecting, via the controller bundle executed by the processor, a request to execute the aliased additional version of the application;
   identifying the additional active application proxy object that represents the aliased version of the application within the service registry;
   retrieving, from the service registry, the reference to the bundle and the entry point class name stored within the additional active application proxy object that represents the aliased additional version of application as the additional active registered service;
   loading the defined entry point class of the aliased additional version of the application from the bundle using the retrieved reference to the bundle and the retrieved entry point class name; and
   calling an entry method of the defined entry point class of the aliased additional version of the application within the bundle.

8. A system, comprising:
   a memory that stores a bundle framework; and
   a processor programmed to:
      detect, via a controller bundle executed by the processor, a bundle entering a set of starting and active bundles within a bundle framework;
      determine that a manifest of the bundle comprises an extension header that identifies an application and an aliased additional version of the application;
      determine that an active application proxy object that represents the application as an active service registered from a previously-started bundle already exists within a service registry;
      create an inactive application proxy object that represents a defined entry point class of the application and an additional active application proxy object that represents a defined entry point class of the aliased additional version of the application; and
      register the created additional active application proxy object as an additional active service within the service registry of the bundle framework.

9. The system of claim 8, where the processor is further programmed to register the created inactive application proxy object as an inactive service within the service registry of the bundle framework.

10. The system of claim 8, where in being programmed to determine that the manifest of the bundle comprises the extension header that identifies the application and the aliased additional version of the application, the processor is programmed to:

retrieve the manifest of the bundle;
parse the manifest of the bundle; and
determine that the extension header comprises an executable binary of the application and the aliased additional version of the application.

11. The system of claim 8, where in being programmed to determine that the active application proxy object that represents the application as the active service registered from the previously-started bundle already exists within the service registry, the processor is programmed to:
search the service registry of registered application proxy objects; and
identify the active application proxy object that represents the application as an active service registered from the previously-started bundle as one of the registered application proxy objects.

12. The system of claim 8, where in being programmed to create the inactive application proxy object that represents the defined entry point class of the application and the additional active application proxy object that represents the defined entry point class of the aliased additional version of the application, the processor is programmed to:
store an entry point class name of the defined entry point class within the additional active application proxy object in the service registry;
store a reference to the bundle within the additional active application proxy object in the service registry;
store an entry point class name of the defined entry point class within the inactive application proxy object in the service registry; and
store the reference to the bundle within the inactive application proxy object in the service registry.

13. The system of claim 12, where the active application proxy object that represents the application as the active service registered from the previously-started bundle comprises a stored reference to the previously-started bundle and a stored entry point class name of the application within the previously-started bundle and where the processor is further programmed to:
detect, via the controller bundle executed by the processor, a request to execute the application;
identify the active application proxy object that represents the application within the service registry;
retrieve, from the service registry, the reference to the previously-started bundle and the entry point class name stored within the active application proxy object that represents the application as the active registered service;
load the defined entry point class of the application from the previously-started bundle using the retrieved reference to the previously-started bundle and the retrieved entry point class name; and
call an entry method of the defined entry point class of the application within the previously-started bundle.

14. The system of claim 12, where the processor is further programmed to:
detect, via the controller bundle executed by the processor, a request to execute the aliased additional version of the application;
identify the additional active application proxy object that represents the aliased version of the application within the service registry;
retrieve, from the service registry, the reference to the bundle and the entry point class name stored within the additional active application proxy object that represents the aliased additional version of application as the additional active registered service;
load the defined entry point class of the aliased additional version of the application from the bundle using the retrieved reference to the bundle and the retrieved entry point class name; and
call an entry method of the defined entry point class of the aliased additional version of the application within the bundle.

15. A computer program product comprising a computer readable storage medium including computer readable program code, where the computer readable program code when executed on a computer causes the computer to:
detect a bundle entering a set of starting and active bundles within a bundle framework;
determine that a manifest of the bundle comprises an extension header that identifies an application and an aliased additional version of the application;
determine that an active application proxy object that represents the application as an active service registered from a previously-started bundle already exists within a service registry;
create an inactive application proxy object that represents a defined entry point class of the application and an additional active application proxy object that represents a defined entry point class of the aliased additional version of the application; and
register the created additional active application proxy object as an additional active service within the service registry of the bundle framework.

16. The computer program product of claim 15, where the computer readable program code when executed on the computer further causes the computer to register the created inactive application proxy object as an inactive service within the service registry of the bundle framework.

17. The computer program product of claim 15, where in causing the computer to determine that the manifest of the bundle comprises the extension header that identifies the application and the aliased additional version of the application the computer readable program code when executed on the computer causes the computer to:
retrieve the manifest of the bundle;
parse the manifest of the bundle; and
determine that the extension header comprises an executable binary of the application and the aliased additional version of the application.

18. The computer program product of claim 15, where in causing the computer to determine that the active application proxy object that represents the application as the active service registered from the previously-started bundle already exists within the service registry the computer readable program code when executed on the computer causes the computer to:
search the service registry of registered application proxy objects; and
identify the active application proxy object that represents the application as an active service registered from the previously-started bundle as one of the registered application proxy objects.

19. The computer program product of claim 15, where in causing the computer to create the inactive application proxy object that represents the defined entry point class of the application and the additional active application proxy object that represents the defined entry point class of the aliased additional version of the application the computer readable program code when executed on the computer causes the computer to:

store an entry point class name of the defined entry point class within the additional active application proxy object;

store a reference to the bundle within the additional active application proxy object;

store an entry point class name of the defined entry point class within the inactive application proxy object; and store the reference to the bundle within the inactive application proxy object.

20. The computer program product of claim 19, where the active application proxy object that represents the application as the active service registered from the previously-started bundle comprises a stored reference to the previously-started bundle and a stored entry point class name of the application within the previously-started bundle and where the computer readable program code when executed on the computer further causes the computer to:

detect a request to execute the application;

identify the active application proxy object that represents the application within the service registry;

retrieve, from the service registry, the reference to the previously-started bundle and the entry point class name stored within the active application proxy object that represents the application as the active registered service;

load the defined entry point class of the application from the previously-started bundle using the retrieved reference to the previously-started bundle and the retrieved entry point class name; and call an entry method of the defined entry point class of the application within the previously-started bundle.

21. The computer program product of claim 19, where the computer readable program code when executed on the computer further causes the computer to:

detect a request to execute the aliased additional version of the application;

identify the additional active application proxy object that represents the aliased version of the application within the service registry;

retrieve, from the service registry, the reference to the bundle and the entry point class name stored within the additional active application proxy object that represents the aliased additional version of application as the additional active registered service;

load the defined entry point class of the aliased additional version of the application from the bundle using the retrieved reference to the bundle and the retrieved entry point class name; and call an entry method of the defined entry point class of the aliased additional version of the application within the bundle.

* * * * *